US012783170B2

(12) United States Patent
Kim et al.

(10) Patent No.: US 12,783,170 B2
(45) Date of Patent: Nov. 3, 2026

(54) MEMORY SYSTEM COMMAND SCHEDULING AND PRIORITY ADJUSTMENT BASED ON CONGESTION

(71) Applicant: SK hynix Inc., Gyeonggi-do (KR)

(72) Inventors: Jihwan Kim, Gyeonggi-do (KR); Young Ook Song, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 269 days.

(21) Appl. No.: 18/594,753

(22) Filed: Mar. 4, 2024

(65) Prior Publication Data

US 2025/0165183 A1 May 22, 2025

(30) Foreign Application Priority Data

Nov. 20, 2023 (KR) ........................ 10-2023-0160616

(51) Int. Cl.
*G06F 3/06* (2006.01)

(52) U.S. Cl.
CPC .......... *G06F 3/0659* (2013.01); *G06F 3/0604* (2013.01); *G06F 3/0635* (2013.01); *G06F 3/0673* (2013.01)

(58) Field of Classification Search
CPC .... G06F 3/0659; G06F 3/0604; G06F 3/0635; G06F 3/0673; G06F 13/1689; G06F 13/1668; G06F 3/0613; G06F 3/0656; G06F 3/0658; G06F 3/0679; G06F 3/0614; G06F 2212/1016; G06F 2212/1032
See application file for complete search history.

(56) References Cited

U.S. PATENT DOCUMENTS

| | | | | |
|---|---|---|---|---|
| 9,350,659 | B1 | 5/2016 | Orr et al. | |
| 2014/0122790 | A1 | 5/2014 | Lasserre et al. | |
| 2014/0269302 | A1 | 9/2014 | Morandin | |
| 2016/0117119 | A1 * | 4/2016 | Kim .................... | G06F 13/1642 711/103 |
| 2016/0239441 | A1 | 8/2016 | Chun et al. | |
| 2019/0386924 | A1 | 12/2019 | Srinivasan et al. | |

(Continued)

FOREIGN PATENT DOCUMENTS

WO 2009/003038 A2 12/2008

OTHER PUBLICATIONS

Extended European Search Report for European Patent Application No. 24200948.8 issued by the European Patent Office on Mar. 18, 2025.

(Continued)

*Primary Examiner* — Arpan P. Savla
*Assistant Examiner* — Edmund H Kwong
(74) *Attorney, Agent, or Firm* — IP&T GROUP LLP

(57) ABSTRACT

A memory controller includes a response buffer configured to store responses provided from a memory device; a congestion monitoring circuit configured to monitor a congestion degree at an egress port of the memory controller; a priority control circuit configured to adjust a priority of commands to process second commands corresponding to an internal operation prior to first commands corresponding to a host-requested operation, based on the congestion degree at the egress port and a fill-level of the response buffer; and a command generation circuit configured to schedule the first commands and the second commands according to the priority and output the scheduled commands to the memory device.

20 Claims, 9 Drawing Sheets

(56) References Cited

U.S. PATENT DOCUMENTS

| | | | | |
|---|---|---|---|---|
| 2020/0020384 | A1* | 1/2020 | Zhao | G06F 13/18 |
| 2020/0042207 | A1* | 2/2020 | Kwak | G06F 3/0625 |
| 2023/0090008 | A1* | 3/2023 | Kajihara | G06F 3/0619<br>711/154 |
| 2024/0201858 | A1* | 6/2024 | Kim | G06F 3/0659 |
| 2025/0279130 | A1* | 9/2025 | Putti | G11C 11/40615 |

OTHER PUBLICATIONS

Compute Express Link (CXL) Specification, Aug. 1, 2022, Revision 3.0 Version 1.0.

* cited by examiner

| | VD | RDY | CONDITION |
|---|---|---|---|
| SAM_B# | 0 | 0 | |
| | 0 | 1 | |
| | 1 | 0 | BACK-PRESSURED |
| | 1 | 1 | |

MEMORY SYSTEM COMMAND SCHEDULING AND PRIORITY ADJUSTMENT BASED ON CONGESTION

CROSS-REFERENCE TO RELATED APPLICATION

The present application claims the benefit of Korean Patent Application No. 10-2023-0160616, filed on Nov. 20, 2023, which is incorporated herein by reference in its entirety.

BACKGROUND

1. Field

Various embodiments of the present disclosure relate to a semiconductor design technology, and more particularly, to a memory system including a memory controller for scheduling and issuing a command to a memory device.

2. Description of the Related Art

An electronic device for storing data may include a host device and a memory system including a memory device. The host device and the memory system may be connected through various standard interface protocols. As high-speed and high-capacity data processing of the electronic device is required, a high-speed operation of an interface protocol for connecting the host device and the memory system or an interface device adopting the same is becoming increasingly important.

SUMMARY

Embodiments of the present disclosure are directed to a memory controller capable of scheduling a command according to a congestion degree of an egress port and a fill-level of a response buffer, and a memory system including the same.

According to an embodiment of the present disclosure, a memory controller includes a response buffer configured to store responses provided from a memory device; a congestion monitoring circuit configured to monitor a congestion degree at an egress port of the memory controller; a priority control circuit configured to adjust a priority of commands to process second commands corresponding to an internal operation prior to first commands corresponding to a host-requested operation, based on the congestion degree at the egress port and a fill-level of the response buffer; and a command generation circuit configured to schedule the first commands and the second commands according to the priority and output the scheduled commands to the memory device.

According to an embodiment of the present disclosure, a memory system includes a memory device; and a memory controller configured to schedule second commands corresponding to an internal operation to be processed prior to first command corresponding to a host-requested operation, according to a congestion degree at an egress port of the memory system and a fill-level of a response buffer configured to store responses provided from the memory device.

According to an embodiment of the present disclosure, an operating method of a memory controller includes determining a throughput based a congestion degree at an egress port of the memory controller; determining a time window according to a fill-level of a response buffer that stores responses provided from a memory device and the throughput; and scheduling second commands corresponding to an internal operation and first command corresponding to a host-requested operation, while adjusting a priority of the second commands according to a result of comparing the time window with execution times for the second commands.

Further, according to embodiments of the present disclosure, the memory system may calculate an available time window according to the congestion degree at the egress port and the quantity of responses to be transmitted to the host device, and perform an internal operation that is not requested by the host device within the available time window. Thus, it is possible to improve the performance by preemptively performing the internal operation that causes a deterioration in quality of service (QoS).

DETAILED DESCRIPTION

Figure 1:
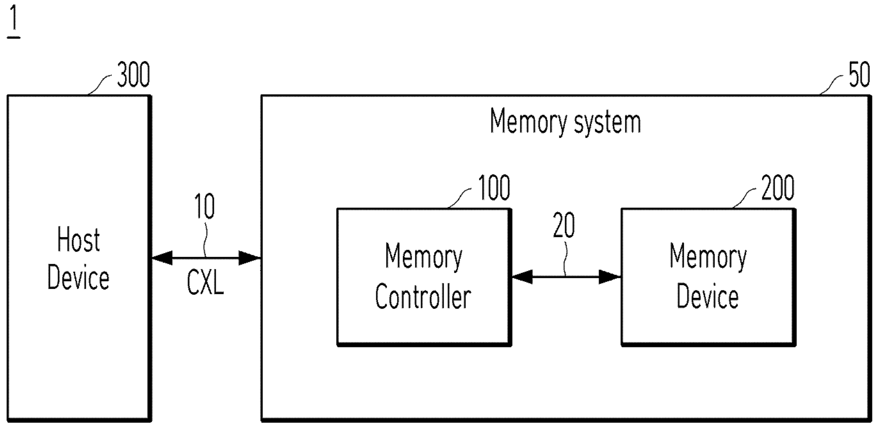
FIG. 1 is a block diagram illustrating a data processing system according to an embodiment of the present disclosure.

Various embodiments of the present disclosure will be described below in more detail with reference to the accompanying drawings. The embodiments of present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout this disclosure, like reference numerals refer to like parts throughout the various figures and embodiments of the present disclosure.

It will be understood that when an element is referred to as being “coupled” or “connected” to another element, it may mean that the two are directly coupled or the two are electrically connected to each other with another circuit intervening therebetween. It will be further understood that the terms “comprise”, “include”, “have”, etc. when used in this specification, specify the presence of stated features, numbers, steps, operations, elements, components, and/or combinations of them but do not preclude the presence or addition of one or more other features, numbers, steps, operations, elements, components, and/or combinations thereof. In the present disclosure, the singular forms are intended to include the plural forms as well, unless the context clearly indicates otherwise.

FIG. 1 is a block diagram illustrating a data processing system 1 according to an embodiment of the present disclosure.

Referring to FIG. 1, the data processing system 1 may include a host device 300 and a memory system 50.

The memory system 50 may include a memory controller 100 and a memory device 200. The memory system 50 may store data under the control of the host device 300, such as a cellular phone, a smartphone, an MP3 player, a laptop computer, a desktop computer, a game player, a TV, a tablet PC, or an in-vehicle infotainment system. The host device 300 may be an external device of the memory system 50.

The memory system 50 may be manufactured as any of various types of memory modules depending on a host interface that is a communication method with the host device 300. The memory system 50 may be configured with any of various types of memory modules, such as an SSD, a multimedia card in a form of an MMC, an eMMC, an RS-MMC, and a micro-MMC, a secure digital card in a form of an SD, a mini-SD, and a micro-SD, a universal serial bus (USB) memory module, a universal flash storage (UFS) device, a personal computer memory card international association (PCMCIA) card type memory module, a peripheral component interconnection (PCI) card type memory module, a PCI express (PCI-E) card type memory module, a compact flash (CF) card, a smart media card, and a memory stick.

The memory device 200 may store data. The memory device 200 may operate under the control of the memory controller 100. The memory device 200 may include a memory cell array including a plurality of memory cells that store data. In an embodiment, the memory cell array may include a plurality of memory blocks. Each memory block may include a plurality of memory cells. One memory block may include a plurality of pages. In an embodiment, the page may be a unit for storing data in the memory device 200 or reading data stored in the memory device 200.

In an embodiment, the memory device 200 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive RAM (MRAM), a ferroelectric RAM (FRAM), a spin transfer torque RAM (STT-RAM), or others.

The memory device 200 is configured to receive a command and an address from the memory controller 100 and access an area selected by the address of the memory cell array. That is, the memory device 200 may perform an operation instructed by the command on the area selected by the address. For example, the memory device 200 may perform a write operation (e.g., program operation) to write data to the area selected by the address. During a read operation, the memory device 200 may read data from the area selected by the address.

The memory controller 100 may control an overall operation of the memory system 50. The memory controller 100 may control the memory device 200 to perform the write operation, the read operation, or other operations according to a request of the host device 300. The memory controller 100 may provide a command, an address, and/or data for performing an operation directly requested from the host device 300 to the memory device 200. For example, during the write operation, the memory controller 100 may provide a write command, an address, and data to the memory device 200. During the read operation, the memory controller 100 may provide a read command and an address to the memory device 200. In addition, the memory controller 100 may generate a command and an address by itself regardless of a request from the host device 300 and transmit it to the memory device 200. That is, the memory controller 100 may provide a command, an address, and/or data for performing an operation that is not directly requested from the host device 300 to the memory device 200. For example, the memory controller 100 may generate a write-queue flush command for performing a write-queue flush operation, a refresh command for performing a refresh operation, and a scrubbing command for performing a scrubbing operation, regardless of the request from the host device 300.

The host device 300 may communicate with the memory system 50 using a communication standard or protocol such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a compute express link (CXL), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

In an embodiment, the host device 300 may communicate with the memory system 50 through a first interface 10. The first interface 10 may be referred to as a host interface. The first interface 10 may include an interface implemented based on a compute express link (CXL) protocol. The CXL protocol may use a serial interface. The memory controller 100 and the memory device 200 may communicate through a second interface 20. The second interface 20 may include an interface implemented based on a dual inline memory module (DIMM) protocol. The second interface 20 may be referred to as a memory interface.

In the case of a data processing system supporting the CXL interface, multiple host devices and multiple logical devices (i.e., memory systems) may be coupled to each other through the CXL interface.

Figure 2:
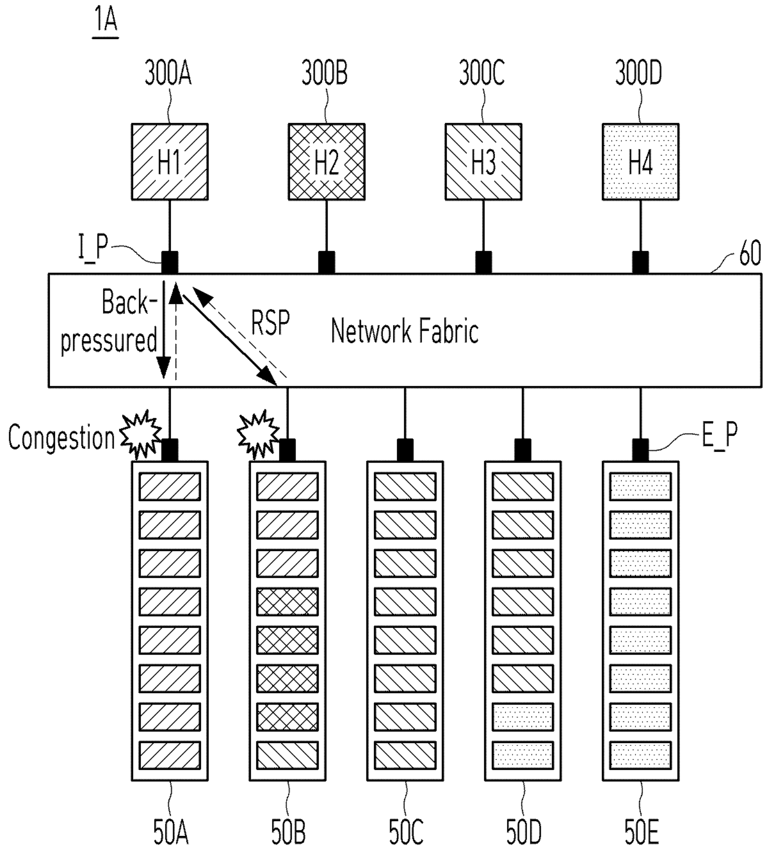
FIG. 2 is a diagram for describing congestion occurring in a data processing system using a CXL interface.

FIG. 2 is a diagram for describing congestion occurring in a data processing system 1A using a CXL interface.

Referring to FIG. 2, the data processing system 1A may include a plurality of host devices 300A, 300B, 300C, and 300D and a plurality of memory systems 50A, 50B, 50C, 50D, and 50E. The plurality of host devices 300A, 300B, 300C, and 300D and the plurality of memory systems 50A, 50B, 50C, 50D, and 50E may be coupled through a network fabric 60. The plurality of host devices 300A, 300B, 300C, and 300D may correspond to the host device 300 of FIG. 1, and each of the plurality of memory systems 50A, 50B, 50C, 50D, and 50E may correspond to the memory system 50 of FIG. 1. The network fabric 60 may also be referred to as a CXL switch.

The network fabric 60 may include a basic infrastructure of a computer network that provides communication between network devices. The network fabric 60 may provide a scalable and flexible framework for forming a network by interconnecting several devices such as a switch, a router, and a server. The network fabric 60 may determine a data transmission method and an overall operation of a network. The configuration and operation of the network fabric 60 may affect the performance, scalability, and reliability of the network. According to embodiments, the network fabric 60 may provide a high-speed data transfer, efficient use of network resources, and a robust error handling and recovery mechanism. For example, the network fabric 60 may couple the plurality of host devices 300A, 300B, 300C, and 300D to the plurality of memory systems 50A, 50B, 50C, 50D, and 50E through the CXL interface.

As illustrated in FIG. 2, data corresponding to plural host devices may be stored in one memory system, and data corresponding to one host device may be distributed and stored in plural memory systems. For example, data corresponding to the first to third host devices 300A, 300B, and 300C may be stored in the second memory system 50B. Data corresponding to the first host device 300A may be distributed and stored in the first and second memory systems 50A and 50B.

The plurality of memory systems 50A, 50B, 50C, 50D, and 50E may transmit response signals RSP notifying that a read or write operation is completed, to the host device requesting the read or write operation through an egress port E_P. For example, the first and second memory systems 50A and 50B may transmit response signals RSP notifying that the requested operation is completed to the first host device 300A. In this case, a bottleneck occurs in an ingress port I_P of the first host device 300A due to the response signals RSP transmitted from the first and second memory systems 50A and 50B. The first host device 300A back-pressures (i.e., back-pressurizes) the first and second memory systems 50A and 50B due to the bottleneck, which may cause congestion at the egress port E_P of each memory system.

Hereinafter, a memory controller capable of scheduling a command based on the congestion degree of an egress port according to an embodiment of the present disclosure will be described with reference to the drawings.

Figure 3:
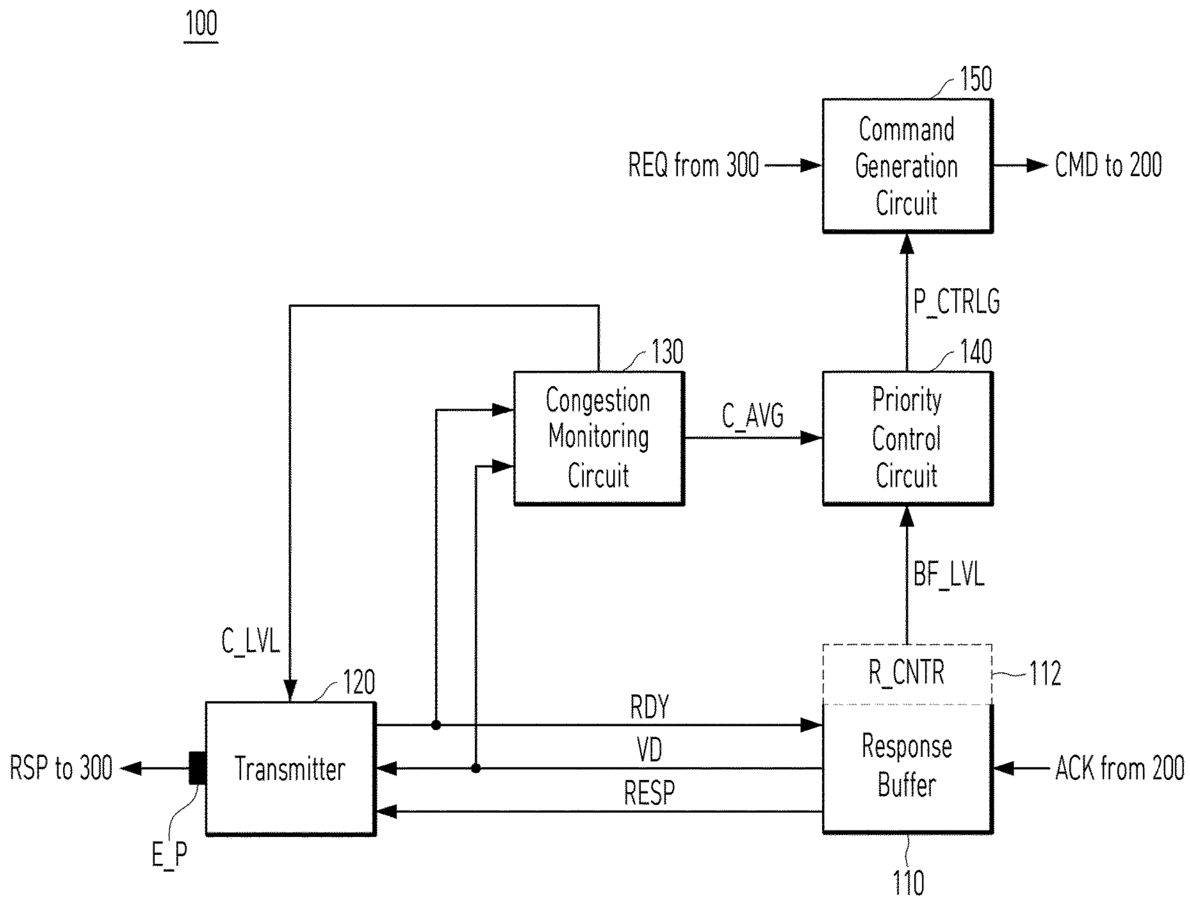
FIG. 3 is a detailed block diagram illustrating a memory controller according to an embodiment of the present disclosure.

FIG. 3 is a detailed block diagram illustrating the memory controller 100 according to an embodiment of the present disclosure.

Referring to FIG. 3, the memory controller 100 may include a response buffer 110, a transmitter 120, a congestion monitoring circuit 130, a priority control circuit 140, and a command generation circuit 150.

The response buffer 110 may store responses ACK provided from a memory device (200 of FIG. 1). The response buffer 110 may sequentially output stored responses RESP in response to a ready signal RDY that is output from the transmitter 120. The ready signal RDY may be a signal indicating that the transmitter 120 is ready to transmit a response. The response buffer 110 may transmit a valid signal VD indicating that the response RESP is valid, together with the response RESP. In an embodiment of the present disclosure, the response buffer 110 includes a plurality of fields for storing the responses ACK, respectively, and may output, as a fill-level BF_LVL, information on the number of fields in which valid responses are stored. The fill-level BF_LVL may be determined according to a product of the number of fields in which valid responses are stored and a field width of the response buffer 110. According to an embodiment, the memory controller 100 may include a response counter R_CNTR 112 that generates the fill-level BF_LVL by counting the number of fields in which valid responses are stored. Hereinafter, a case where both the ready signal RDY and the valid signal VD are signals activated to a logic high level will be described as an example.

The transmitter 120 may receive the response RESP provided from the response buffer 110 when the valid signal VD is activated, convert the response RESP into a format suitable for the host interface, and transmit a response signal RSP to a host device (300 of FIG. 1) through an egress port E_P. The transmitter 120 may output the ready signal RDY indicating that it is ready to transmit a response. According to an embodiment, the transmitter 120 may receive a congestion level C_LVL from the congestion monitoring circuit 130, and transmit, to the host device 300, the response signal RSP that incorporates information on the congestion level C_LVL as a part thereof.

The congestion monitoring circuit 130 may monitor a degree of congestion (hereinafter, referred to as a congestion degree) at the egress port E_P. The congestion monitoring circuit 130 may calculate an average congestion rate C_AVG and the congestion level C_LVL by tracking the congestion degree at the egress port E_P for each monitoring section. The congestion monitoring circuit 130 may calculate the average congestion rate C_AVG by sampling cases in which a back-pressured condition has occurred for each monitoring section based on the ready signal RDY and the valid signal VD, which are input/output to/from the response buffer 110, and generate the congestion level C_LVL by dividing the calculated average congestion rate C_AVG based on a plurality of thresholds.

The priority control circuit 140 may adjust a priority of commands to process second commands corresponding to an internal operation prior to first commands corresponding to a host-requested operation, based on the congestion degree at the egress port E_P and the fill-level BF_LVL of the response buffer 110. For example, the priority control circuit 140 may generate a priority control signal group P_CTRLG for adjusting the priority according to the average congestion rate C_AVG and the fill-level BF_LVL of the response buffer 110. The priority control signal group P_CTRLG may include a plurality of rate control signals and a plurality of selection signals for controlling the command generation circuit 150. In an embodiment of the present disclosure, the priority control circuit 140 may calculate a throughput based on the average congestion rate C_AVG, and determine a time window according to the fill-level BF_LVL of the response buffer 110 and the throughput. The priority control circuit 140 may adjust the priority to process the second commands prior to the first commands by increasing the priority of the second commands according to a result of comparing the time window with execution times for the second commands.

The command generation circuit 150 may provide a command CMD to the memory device 200 by scheduling the first commands corresponding to the host-requested operation and the second commands corresponding to the internal operation, according to the priority control signal group P_CTRLG. In this case, the first commands may be commands for performing an operation directly requested from the host device 300 according to a request REQ from the host device 300, and may include, for example, a read command, a write command, and the like. On the other hand, the second commands may be commands for performing an internal operation that is not directly requested from the host device 300, and may include, for example, a write-queue flush command, a refresh command, and a scrubbing command.

When a write request is input from the host device 300, the memory controller 100 may transmit a response signal RSP to the host device 300, then store a corresponding write command in a write-queue of a request queue, and perform a delayed write operation by internally scheduling commands stored in the request queue. Accordingly, an improved operation speed may be achieved through an early response characteristic while maintaining reliability. The write-queue flush command may be a command to perform the delayed write operation according to the write command stored in the write-queue of the request queue after the early response. The refresh command may be a command issued periodically or non-periodically to refresh a plurality of rows of the memory device 200. The scrubbing command may be a command for reading data from the memory device 200, checking and correcting errors in the data, and re-writing error corrected data to the memory device 200 and may include a scrubbing read command and a scrubbing write command.

As described above, in an embodiment of the present disclosure, the memory controller 100 may calculate the average congestion rate C_AVG by monitoring the congestion degree at the egress port E_P, schedule the second commands corresponding to the internal operation to be processed prior to the first commands corresponding to the host-requested operation, according to the average congestion rate C_AVG and the fill-level BF_LVL of the response buffer 110, and provide the scheduled commands to the memory device 200.

Hereinafter, each configuration of the memory controller 100 of FIG. 2 will be described in detail with reference to the drawings.

Figure 4:
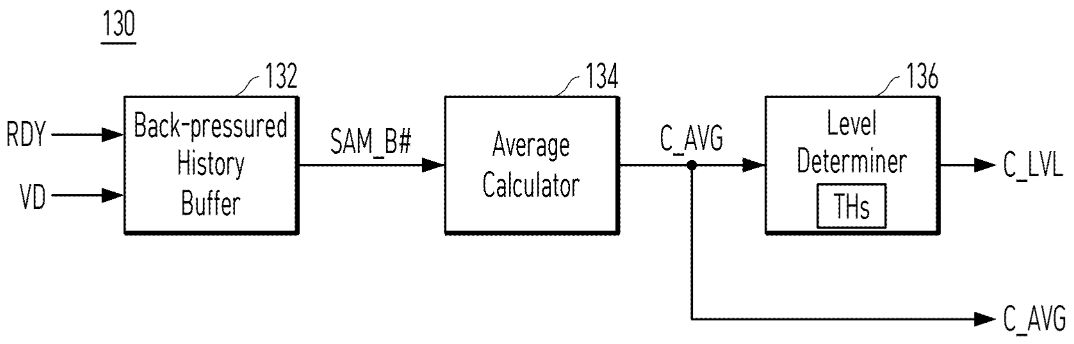
FIG. 4 is a detailed block diagram illustrating a congestion monitoring circuit of FIG. 3.
Figures 5, 6:
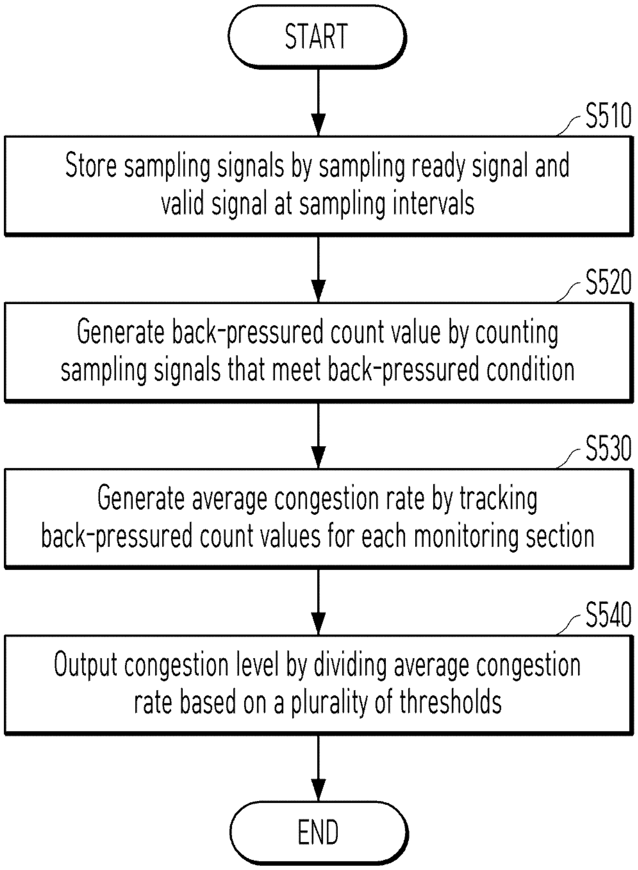
FIG. 5 is a table for describing a back-pressured condition of FIG. 4.
FIG. 6 is a flowchart for describing an operation of the congestion monitoring circuit of FIG. 4.

FIG. 4 is a detailed block diagram illustrating the congestion monitoring circuit 130 of FIG. 3. FIG. 5 is a table for describing a back-pressured condition of FIG. 4.

Referring to FIG. 4, the congestion monitoring circuit 130 may include a back-pressured history buffer 132, an average calculator 134, and a level determiner 136.

The back-pressured history buffer 132 may store a plurality of sampling signals SAM_B # obtained by sampling the ready signal RDY and the valid signal VD at preset sampling intervals. The back-pressured history buffer 132 may generate a sampling signal consisting of 2 bits by sampling logic levels of the ready signal RDY and the valid signal VD at each sampling interval, and sequentially store the sampling signal as the plurality of sampling signals SAM_B #. In this case, a lower bit LSB of each sampling signal SAM_B # corresponds to the ready signal RDY and an upper bit MSB corresponds to the valid signal VD. For example, the sampling signal of "01" is a signal generated by sampling the ready signal RDY of a logic high level and the valid signal VD of a logic low level.

The average calculator 134 may generate a back-pressured count value by counting the number of sampling signals that satisfy the back-pressured condition, among the sampling signals SAM_B # input during a monitoring section. As shown in FIG. 5, the average calculator 134 may determine that a sampling signal sampled when the ready signal RDY is deactivated to a logic low level and the valid signal VD is activated to a logic high level (i.e., when the sampling signal is "10"), satisfies the back-pressured condition. The monitoring section may be set to an integer multiple of the sampling interval.

Further, the average calculator 134 may generate the average congestion rate C_AVG expressed as a percentage by tracking the back-pressured count value for each monitoring section. That is, the average congestion rate C_AVG may have a value between 0 and 1 (or between 0% and 100%) depending on the congestion degree. The average calculator 134 may calculate the average congestion rate C_AVG by averaging the back-pressured count value tracked for each monitoring section with a back-pressured count value tracked for a previous monitoring section.

The level determiner 136 may output the congestion level C_LVL composed of one or more bits by dividing the average congestion rate C_AVG based on a plurality of thresholds THs.

FIG. 6 is a flowchart for describing an operation of the congestion monitoring circuit 130 of FIG. 4.

Referring to FIG. 6, the back-pressured history buffer 132 may store the plurality of sampling signals SAM_B # obtained by sampling the ready signal RDY and the valid signal VD at sampling intervals (at S510). For example, when the sampling interval is set to 1 ns, the back-pressured history buffer 132 may generate the plurality of sampling signals SAM_B # by sampling logic levels of the ready signal RDY and the valid signal VD every 1 ns and sequentially storing the sampling signal of 2 bits having one of "00", "01", "10", and "11".

The average calculator 134 may generate the back-pressured count value by counting the number of sampling signals SAM_B # that satisfy the back-pressured condition (i.e., "10") during the monitoring section (at S520). For example, if the sampling interval is 1 ns and the monitoring section is set to 100 ns, the average calculator 134 may receive 100 sampling signals SAM_B # during the 100 ns section, and generate the back-pressured count value by counting the number of sampling signals of "10" among the 100 sampling signals SAM_B #.

The average calculator 134 may generate the average congestion rate C_AVG expressed as a percentage by tracking the back-pressured count value for each monitoring section (at S530). For example, the average calculator 134 may calculate a back-pressured count value of 10 by counting the number of sampling signals satisfying the back-pressured condition, among the 100 sampling signals SAM_B #, during a first monitoring section, and calculate a congestion rate of the first monitoring section as 0.1 (or 10%). Thereafter, the average calculator 134 may calculate a back-pressured count value of 50 by counting the number of sampling signals satisfying the back-pressured condition, among the 100 sampling signals SAM_B #, during a second monitoring section, and calculate a congestion rate of the second monitoring section as 0.5 (or 50%). In this case, the average calculator 134 may calculate the average congestion rate C_AVG of 0.3 (or 30%) by averaging the congestion rate 0.1 (or 10%) of the first monitoring section and the congestion rate 0.5 (or 50%) of the second monitoring section. In this way, the average calculator 134 may track the back-pressured count value for each monitoring section to generate the average congestion rate C_AVG expressed as a percentage.

The level determiner 136 may output the congestion level C_LVL by dividing the average congestion rate C_AVG based on the plurality of thresholds THs (at S540). For example, when four thresholds THs of 0.25, 0.5, 0.75, and 1 are set, the level determiner 136 may output the average congestion rate C_AVG between 0 and 0.25 as the congestion level C_LVL of "00", and output the average congestion rate C_AVG between 0.25 and 0.5 as the congestion level C_LVL of "01", output the average congestion rate C_AVG between 0.5 and 0.75 as the congestion level C_LVL of "10", and output the average congestion rate C_AVG between 0.75 and 1.0 as the congestion level C_LVL of "11".

As described above, the congestion monitoring circuit 130 may sample back-pressured cases for each monitoring section based on the ready signal RDY and the effective signal VD, calculate the average congestion rate C_AVG, and output the congestion level C_LVL by classifying the calculated average congestion rate C_AVG according to the thresholds.

Figure 7:
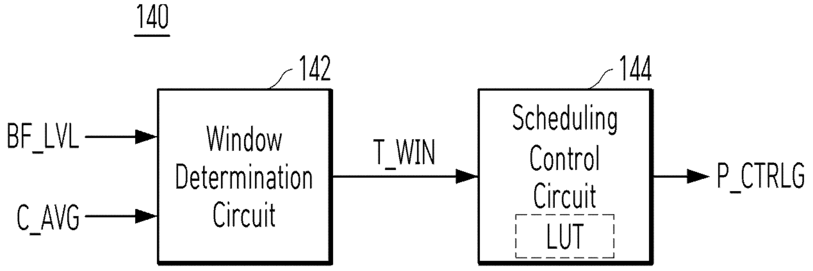
FIG. 7 is a detailed block diagram illustrating a priority control circuit of FIG. 3.

FIG. 7 is a detailed block diagram illustrating the priority control circuit 140 of FIG. 3.

Referring to FIG. 7, the priority control circuit 140 may include a window determination circuit 142 and a scheduling control circuit 144.

The window determination circuit 142 may calculate the throughput based on the average congestion rate C_AVG and determine the time window T_WIN according to a ratio of the fill-level BF_LVL of the response buffer 110 and the throughput.

The window determination circuit 142 may calculate the throughput based on the average congestion rate C_AVG according to [Equation 1] below. That is, the throughput may have a value reduced by the average congestion rate C_AVG from a maximum throughput. When the average congestion rate C_AVG is 0.3 and the maximum throughput is 8 GByte/s, the throughput may have a value reduced by 30% from the maximum throughput, that is, the throughput may become 5.6 GB/s.

$$\text{Throughput}=\text{maximum throughput}*(1-\text{average congestion rate}) \quad \text{[Equation 1]}$$

Further, the window determination circuit 142 may determine the time window T_WIN according to the ratio of the fill-level BF_LVL of the response buffer 110 and the throughput according to [Equation 2] below. When the fill-level BF_LVL is 7*64 Byte and the throughput is 5.6 GB/s, the time window T_WIN may be set to 7*64/5.6G=80 ns. The window determination circuit 142 may increase a width of the time window T_WIN when the fill-level BF_LVL is greater and the throughput is lower, that is, when the quantity of responses to be sent is large and the congestion degree is high. On the other hand, the time window T_WIN may decrease the width of the time window T_WIN when the fill-level BF_LVL is lower and the throughput is greater, that is, when the congestion degree is low and the quantity of responses to be sent is small.

$$\text{Time window } T\_WIN=\text{fill-level } BF\_LVL*(\text{field width of response buffer})/\text{throughput} \quad \text{[Equation 2]}$$

The scheduling control circuit 144 may adjust the priority control signal group P_CTRLG to increase the priority of the second commands according to a result of comparing the time window T_WIN with the execution times for the second commands.

According to an embodiment, the scheduling control circuit 144 may align the execution times for the second commands in a descending order from the longest time to the shortest time, and sequentially compare the aligned execution times with the time window T_WIN to increase the priority of the second commands. When the execution time having the shortest time is equal to or greater than the time window T_WIN, the scheduling control circuit 144 may maintain the priority of the second commands without increasing the priority.

As an example, the execution time increases in the order of an execution time Ta of the scrubbing read or write operation, an execution time Tb of the write-queue flush operation, and an execution time Tc of the refresh operation, i.e., Tc>Tb>Ta. In this case, when the time window T_WIN is greater than the execution time Tc of the refresh operation, the scheduling control circuit 144 may increase the priority of the refresh command. When the time window T_WIN is equal to or less than the execution time Tc of the refresh operation and greater than the execution time Tb of the write-queue flush operation, the scheduling control circuit 144 may increase the priority of the write-queue flush command. When the time window T_WIN is equal to or less than the execution time Tb of the write-queue flush operation and greater than the execution time Ta of the scrubbing read or write operation, the scheduling control circuit 144 may increase the priority of the scrubbing read or write command.

According to an embodiment, the scheduling control circuit 144 may include a look-up table LUT having a plurality of fields obtained by combining two or more execution times for the second commands. The scheduling control circuit 144 may increase the priority of the second commands stored in a field corresponding to the time window T_WIN. For example, when 80 ns, which is the sum of the execution time Tb of the write-queue flush operation and the execution time Tc of the refresh operation, is stored in a first field of the look-up table LUT, and the time window T_WIN of 80 ns is input, the scheduling control circuit 144 may increase the priority of both the write-queue flush command and the refresh command.

As described above, the priority control circuit 140 may adjust the priority so that the second commands corresponding to the internal operation are processed prior to the first commands corresponding to the host-requested operation according to the average congestion rate C_AVG and the fill-level BF_LVL of the response buffer 110.

Figure 8:
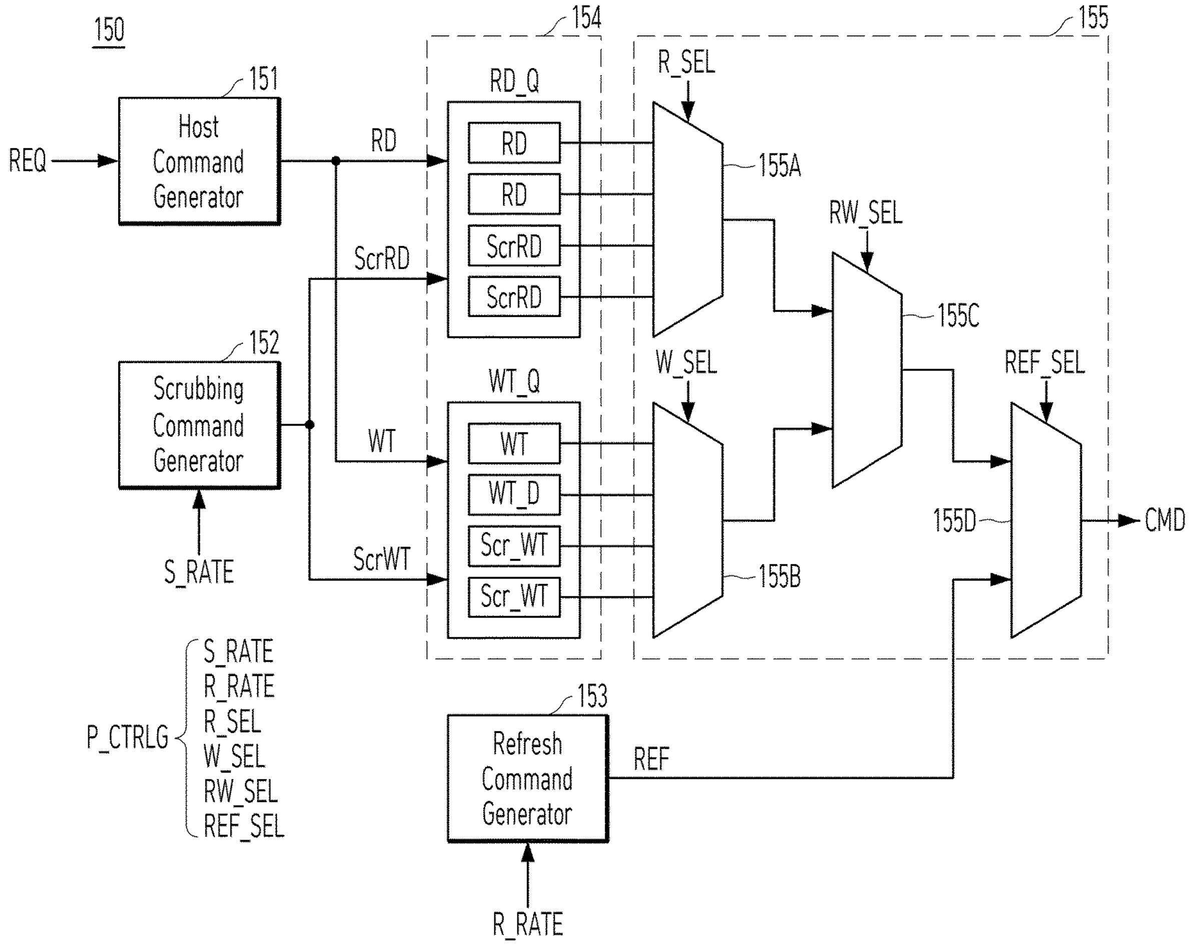
FIG. 8 is a detailed block diagram illustrating a command generation circuit of FIG. 3.

FIG. 8 is a detailed block diagram illustrating the command generation circuit 150 of FIG. 3.

Referring to FIG. 8, the command generation circuit 150 may include a first command generator 151, second command generators 152 and 153, a request queue 154, and an output control circuit 155.

The first command generator 151 may generate first commands RD and WT in response to the request REQ input from the host device 300. The first command generator 151 may generate a read command RD or a write command WT for performing an operation (i.e., a host-requested operation) directly requested from the host device. That is, the first command generator 151 may be a host command generator.

The second command generators 152 and 153 may generate second commands ScrRD, ScrWT and REF by themselves regardless of the request REQ from the host device 300, while adjusting a generation rate of the second commands ScrRD, ScrWT and REF according to a plurality of rate control signals S_RATE and R_RATE.

The second command generators 152 and 153 may include a scrubbing command generator 152 and a refresh command generator 153. The scrubbing command generator 152 may generate a scrubbing read command ScrRD and a scrubbing write command ScrWT according to a first rate control signal S_RATE. The refresh command generator 153 may generate a refresh command REF according to a second rate control signal R_RATE.

The request queue 154 may include a read-queue RD_Q and a write-queue WT_Q. The read-queue RD_Q may sequentially store the read command RD and the scrubbing read command ScrRD, which are related to a read operation. The write-queue WT_Q may sequentially store the write command WT and the scrubbing write command ScrWT, which are related to a write operation. In this case, a write-queue flush command WT_D for performing a delayed write operation after an early response may also be stored in the write-queue WT_Q. That is, the write command WT may be defined as the first command corresponding to a host-requested operation, and the scrubbing write command ScrWT and the write-queue flush command WT_D may be defined as the second command corresponding to an internal operation.

The output control circuit 155 may schedule the first commands RD and WT, and the second commands ScrRD, ScrWT, REF, and WT_D output from the read-queue RD_Q, the write-queue WT_Q, and the refresh command generator 153, according to a plurality of selection signals R_SEL, W_SET, RW_SEL, and REF_D.

The output control circuit 155 may include first to fourth selectors 155A, 155B, 155C, and 155D. The first selector 155A may select and output the read command RD and the scrubbing read command ScrRD stored in the read-queue RD_Q according to a first selection signal R_SEL. The second selector 155B may select and output the write command WT, the write-queue flush command WT_D, and the scrubbing write command ScrWT stored in the write-queue WT_Q according to a second selection signal W_SEL. The third selector 155C may select and output one of outputs of the first selector 155A and the second selector 155B according to a third selection signal RW_SEL. The fourth selector 155D may finally output a command CMD to the memory device 200 by selecting one of outputs of the third selector 155C and the refresh command REF output from the refresh command generator 153, according to a fourth selection signal REF_SEL. That is, the output control circuit 155 may adjust the priority of the first commands RD and WT, and the second commands ScrRD, ScrWT, REF, and WT_D according to the selection signals R_SEL, W_SET, RW_SEL, and REF_SEL.

For reference, the priority control signal group P_CTRLG may include the above-described rate control signals S_RATE and R_RATE and the selection signals R_SEL, W_SET, RW_SEL, and REF_SEL. That is, the priority control circuit 140 may generate the rate control signals S_RATE and R_RATE and the selection signals R_SEL, W_SET, RW_SEL, and REF_SEL according to the average congestion rate C_AVG and the fill-level BF_LVL of the response buffer 110. For example, the priority control circuit 140 may adjust the second rate control signal R_RATE and the fourth selection signal REF_SEL to increase the priority of the refresh command REF. The priority control circuit 140 may adjust the first rate control signal S_RATE and the first selection signal R_SEL to increase the priority of the scrubbing read command ScrRD, and adjust the first rate control signal S_RATE and the second selection signal W_SEL to increase the priority of the scrubbing write command ScrWT. The priority control circuit 140 may adjust the first to fourth selection signals R_SEL, W_SET, RW_SEL, and REF_SEL to increase the priority of the write-queue flush command WT_D.

Figure 9:
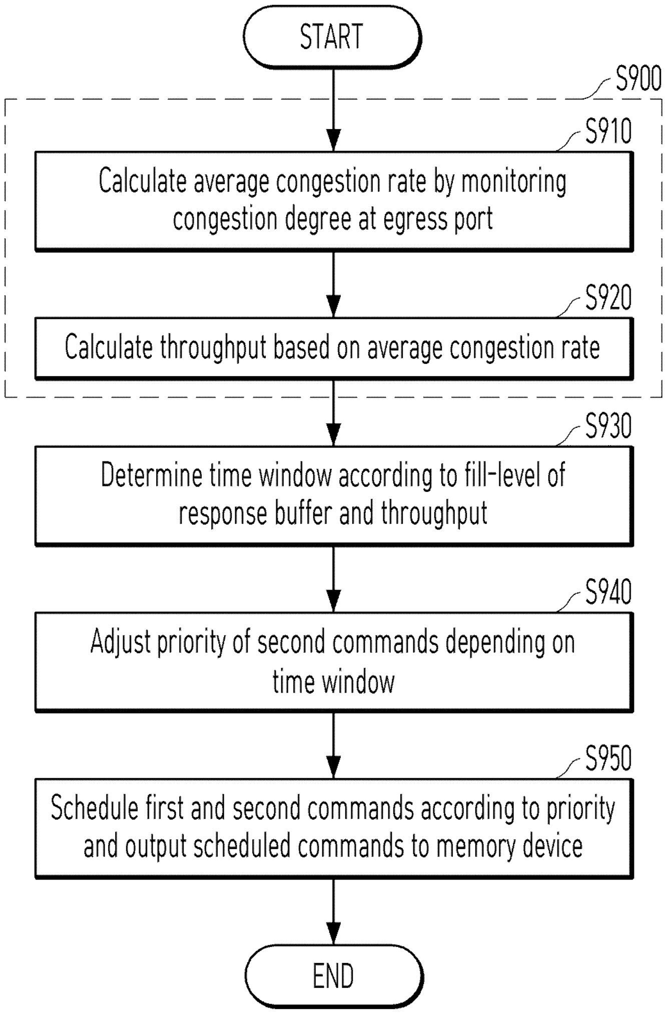
FIGS. 9 and 10 are flowcharts for describing an operation of a memory controller according to an embodiment of the present disclosure.
Figure 10:
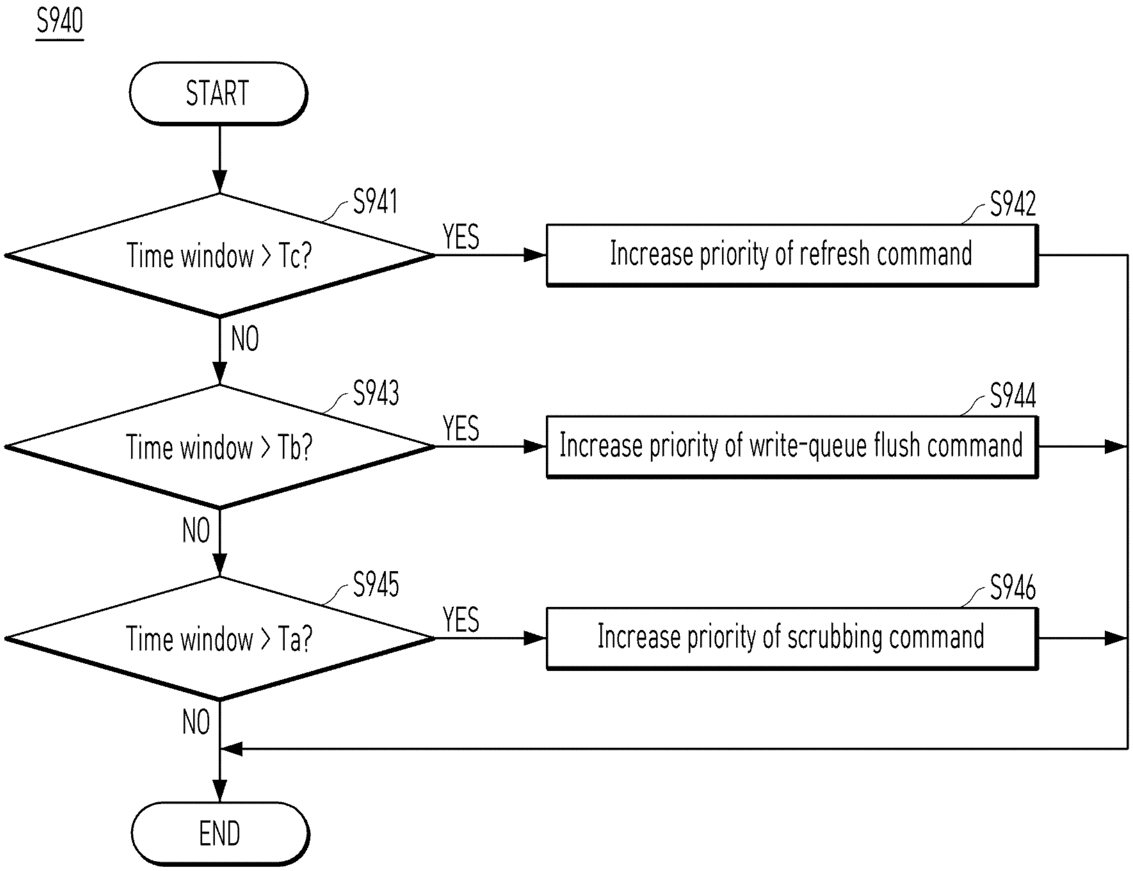

FIGS. 9 and 10 are flowcharts for describing an operation of the memory controller 100 according to an embodiment of the present disclosure.

Referring to FIG. 9, the congestion monitoring circuit 130 may calculate the throughput based on the congestion degree at the egress port E_P (at S900).

In more detail, the congestion monitoring circuit 130 may calculate the average congestion rate C_AVG by monitoring the congestion degree at the egress port E_P (at S910). The congestion monitoring circuit 130 may calculate the average congestion rate C_AVG by sampling cases in which a back-pressured condition has occurred for each monitoring section based on the ready signal RDY and the valid signal VD, which are input/output to/from the response buffer 110.

The window determination circuit 142 may calculate the throughput based on the average congestion rate C_AVG (at S920). The window determination circuit 142 may calculate the throughput reduced by the average congestion rate C_AVG from the maximum throughput.

Further, the window determination circuit 142 may determine the time window T_WIN according to the fill-level BF_LVL of the response buffer 110 and the throughput (at S930). The window determination circuit 142 may increase the width of the time window T_WIN when the fill-level BF_LVL is greater and the throughput is lower, that is, when the quantity of responses to be sent is large and the congestion is high. On the other hand, the time window T_WIN may decrease the width of the time window T_WIN when the fill-level BF_LVL is lower and the throughput is greater, that is, when the congestion level is low and the quantity of responses to be sent is small.

The scheduling control circuit 144 may adjust the priority to increase the priority of the second commands corresponding to the internal operation depending on the time window T_WIN (at S940).

According to an embodiment, the scheduling control circuit 144 may align the execution times for the second commands in descending order from the longest time to the shortest time, and sequentially compare the aligned execution times with the time window T_WIN to increase the priority of the second commands.

Referring to FIG. 10, when the time window T_WIN is greater than the execution time Tc of the refresh operation (i.e., "YES" in S941), the scheduling control circuit 144 may increase the priority of the refresh command REF (at S942). For example, the scheduling control circuit 144 may adjust the second rate control signal R_RATE and the fourth selection signal REF_SEL from the priority control signal group P_CTRLG in order to increase the priority of the refresh command REF.

When the time window T_WIN is equal to or less than the execution time Tc of the refresh operation (i.e., "NO" in S941) and is greater than the execution time Tb of the write-queue flush operation (i.e., "YES" in S943), the scheduling control circuit 144 may increase the priority of the write-queue flush command WT_D (at S944). In this case, the scheduling control circuit 144 may adjust the first to fourth selection signals R_SEL, W_SET, RW_SEL, and REF_SEL to increase the priority of the write-queue flush command WT_D.

When the time window T_WIN is equal to or less than the execution time Tb of the write-queue flush operation (i.e., "NO" in S943) and is greater than the execution time Ta of the scrubbing read or write operation (i.e., "YES" in S945), the scheduling control circuit 144 may increase the priority of the scrubbing read command ScrRD and the scrubbing write command ScrWT (at S946). In this case, the scheduling control circuit 144 may adjust the first rate control signal S_RATE and the first selection signal R_SEL to increase the priority of the scrubbing read command ScrRD, and may adjust the first rate control signal S_RATE and the second selection signal W_SEL to increase the priority of the scrubbing write command ScrWT.

The scheduling control circuit 144 may maintain the priority of the second commands without increasing the priority when the execution time Ta of the scrubbing read or write operation having the shortest time is equal to or greater than the time window T_WIN (i.e., "NO" in S945).

According to an embodiment, the scheduling control circuit 144 may include the look-up table (LUT) having the fields obtained by combining two or more execution times of the second commands and increase the priority of the second commands stored in the field corresponding to the time window T_WIN.

Referring back to FIG. 9, the command generation circuit 150 may schedule the first commands corresponding to the host-requested operation and the second commands corresponding to the internal operation according to the priority control signal group P_CTRLG and output the scheduled commands to the memory device 200 as the command CMD (at S950).

As described above, according to the embodiment of the present disclosure, the memory controller 100 and the memory system 50 including the same may calculate the available time window according to the congestion degree at the egress port and the quantity of responses to be transmitted to the host device, and perform an internal operation that is not requested from the host device within the time window. Therefore, it is possible to improve the performance by preemptively performing the internal operations (e.g., the refresh operation, the scrubbing operation, the write-queue flush operation, etc.) that cause a deterioration in quality of service (QoS).

Figure 11:
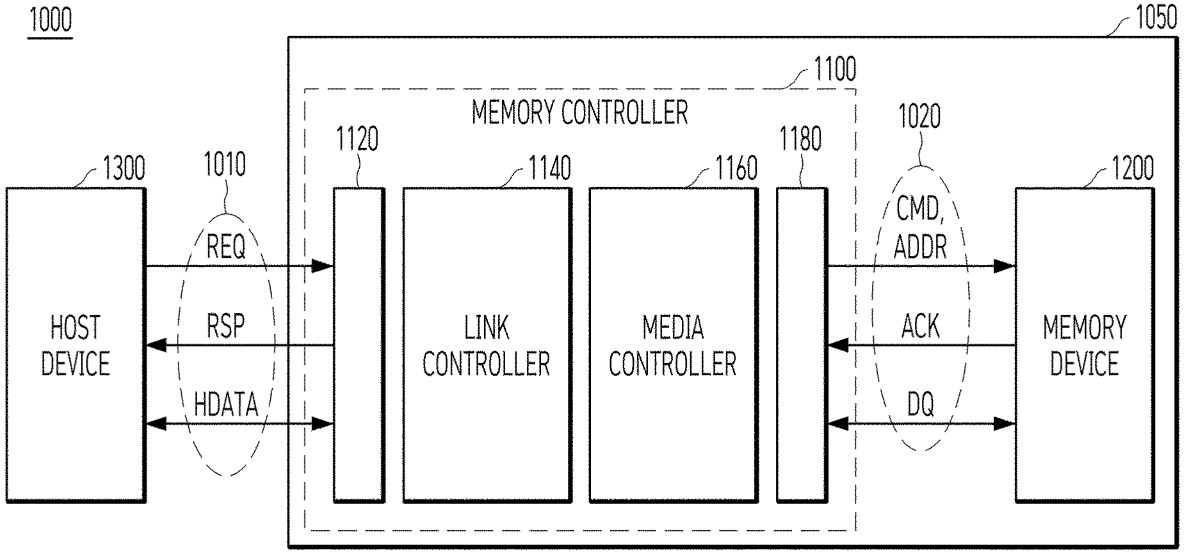
FIG. 11 is a block diagram illustrating a data processing system according to another embodiment of the present disclosure.

FIG. 11 is a block diagram illustrating a data processing system 1000 according to another embodiment of the present disclosure.

Referring to FIG. 11, the data processing system 1000 may include a host device 1300 and a memory system 1050. The memory system 1050 may include a memory controller 1100 and a memory device 1200.

The memory controller 1100 may include a host interface circuit 1120, a link controller 1140, a media controller 1160, and a memory interface circuit 1180.

The host interface circuit 1120 may communicate with the host device 1300 through a host interface 1010. The host interface circuit 1120 may receive a request REQ from the host device 1300 and provide a response signal RSP corresponding thereto to the host device 1300. The host interface circuit 1120 may transmit and receive host data HDATA to and from the host device 1300.

The link controller 1140 may control the host interface circuit 1120 to communicate with the host device 1300 using a compute express link (CXL) protocol.

The memory interface circuit 1180 may communicate with the memory device 1200 through a memory interface 1020. The memory interface circuit 1180 may transmit a command CMD and an address ADDR to the memory device 1200 and receive a response ACK corresponding thereto. The memory interface circuit 1180 may transmit and receive data DQ to and from the memory device 1200.

The media controller 1160 is connected to the memory device 1200 through the memory interface circuit 1180, and controls the overall operation of the memory device 1200.

When the memory device 1200 is formed of a plurality of memory modules, the memory interface circuit 1180 may include a plurality of physical layers corresponding to the memory modules and communicate with a corresponding memory module through a dedicated channel. In addition, the media controller 1160 may include a plurality of media controllers corresponding to a plurality of physical layers and control a corresponding memory module.

In an embodiment of the present disclosure, the transmitter 120 and the congestion monitoring circuit 130 included in the memory controller 100 of FIG. 3 may be disposed in the link controller 1140 of FIG. 11, and the response buffer 110, the priority control circuit 140, and the command generation circuit 150 included in the memory controller 100 of FIG. 3 may be disposed in the media controller 1160 of FIG. 11. That is, the link controller 1140 may monitor a congestion degree of an egress port, and calculate and provide an average congestion rate to the media controller 1160, and the media controller 1160 may adjust a priority so that second commands corresponding to an internal operation are processed prior to first commands corresponding to a host-requested operation, according to the average congestion rate and a fill-level of the response buffer.

However, the embodiments of present disclosure are not limited thereto, and configurations of the memory controller 100 of FIG. 3 may be arranged according to various embodiments. For example, the response buffer 110, the transmitter 120, and the congestion monitoring circuit 130 may be arranged in the link controller 1140, and the priority control circuit 140 and the command generation circuit 150 may be arranged in the media controller 1160.

Various embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

It should be noted that although the technical spirit of the disclosure has been described in connection with embodiments thereof, this is merely for description purposes and should not be interpreted as limiting. It should be appreciated by one of ordinary skill in the art that various changes may be made thereto without departing from the technical spirit of the disclosure and the following claims.

For example, for the logic gates and transistors provided as examples in the above-described embodiments, different positions and types may be implemented depending on the polarity of the input signal.

What is claimed is:

1. A memory controller comprising:

a response buffer configured to store responses provided from a memory device;

a congestion monitoring circuit configured to monitor a congestion degree at an egress port of the memory controller;

a priority control circuit configured to determine a throughput based on the congestion degree, determine a time window according to a fill-level of the response buffer and the throughput, and adjust a priority of commands to process second commands corresponding to an internal operation prior to first commands corresponding to a host-requested operation by increasing the priority of the second commands according to a comparing result of the time window and execution times for the second commands; and a command generation circuit configured to schedule the first commands and the second commands according to the priority and output the scheduled commands to the memory device.

2. The memory controller of claim 1, wherein the first commands include commands for performing an operation requested from a host device, and wherein the second commands include commands for performing the internal operation that is not requested from the host device.

3. The memory controller of claim 1, wherein the second commands include at least one of a write-queue flush command, a refresh command or a scrubbing command.

4. The memory controller of claim 1, wherein the congestion monitoring circuit is configured to determine an average congestion rate by tracking the congestion degree at the egress port for each monitoring section, and wherein the priority control circuit is configured to determine the throughput based on the average congestion rate.

5. The memory controller of claim 4, wherein the priority control circuit is configured to determine the throughput based on the average congestion rate according to [Equation 1] below:

$$\text{Throughput}=\text{maximum throughput}*(1-\text{average congestion rate}). \quad \text{[Equation 1]}$$

6. The memory controller of claim 4, wherein the priority control circuit is configured to:

align the execution times for the second commands in a descending order; and sequentially compare the aligned execution times with the time window to increase the priority of a second command with a certain execution time less than the time window, or to maintain the priority of the second commands without increasing the priority when the execution time having a shortest time is equal to or greater than the time window.

7. The memory controller of claim 4, wherein the priority control circuit includes a look-up table having a plurality of fields obtained by combining two or more execution times for the second commands, and wherein the priority control circuit is configured to increase the priority of the second commands stored in a field corresponding to the time window.

8. The memory controller of claim 1, wherein the response buffer is configured to transmit a response and a valid signal indicating that the response is valid, in response to a ready signal, and wherein the congestion monitoring circuit is configured to determine an average congestion rate corresponding to the congestion degree at the egress port, by sampling cases in which a back-pressured condition has occurred for each monitoring section based on the ready signal and the valid signal.

9. The memory controller of claim 8, wherein the congestion monitoring circuit includes:

a back-pressured history buffer configured to store a plurality of sampling signals obtained by sampling the ready signal and the valid signal at preset sampling intervals; and an average calculator configured to generate a back-pressured count value by counting a number of sampling signals that satisfy the back-pressured condition, among the sampling signals, and generate the average congestion rate by tracking the back-pressured count value for each monitoring section.

10. The memory controller of claim 9, wherein the average calculator is configured to determine that a sampling signal sampled when the ready signal is deactivated and the valid signal is activated, satisfies the back-pressured condition.

11. The memory controller of claim 1, wherein the priority control circuit includes:

a window determination circuit configured to determine the throughput based on the congestion degree at the egress port, and determine the time window according to a ratio of the fill-level of the response buffer and the throughput; and a scheduling control circuit configured to increase the priority of the second commands according to the comparing result.

12. The memory controller of claim 1, wherein the command generation circuit includes:

a first command generator configured to generate the first commands in response to a request from a host device;

a second command generator configured to generate the second commands corresponding to the internal operation regardless of the request from the host device, based on the priority;

a request queue configured to store the first commands and the second commands; and an output control circuit configured to schedule the first commands and the second commands stored in the request queue, according to the priority.

13. The memory controller of claim 1, further comprising:

a response counter configured to generate the fill-level by counting a number of valid responses stored in the response buffer; and a transmitter configured to provide a ready signal to the response buffer and provide a response signal to a host device through the egress port, according to a valid signal provided from the response buffer.

14. A memory system comprising:

a memory device; and a memory controller configured to determine a throughput based on a congestion degree at an egress port of the memory system, determine a time window according to the throughput and a fill-level of the response buffer that stores responses provided from the memory device, and schedule second commands corresponding to an internal operation to be processed prior to first commands corresponding to a host-requested operation while adjusting a priority of the second commands according to a comparing result of the time window and execution times for the second commands.

15. The memory system of claim 14, wherein the memory controller is configured to:

store a plurality of sampling signals obtained by sampling a ready signal and a valid signal, which are input to and output from the response buffer, at preset sampling intervals;

generate a back-pressured count value by counting a number of sampling signals that satisfy a back-pressured condition, among the sampling signals, and generate an average congestion rate corresponding to the congestion degree at the egress port, by tracking the back-pressured count value for each monitoring section.

16. The memory system of claim 14, wherein the memory controller is configured to:

determine an average congestion rate by tracking the congestion degree at the egress port, determine the throughput based on the average congestion rate, determine the time window according to a ratio of the fill-level of the response buffer and the throughput, and adjust the priority of the second commands by increasing the priority according to the comparing result.

17. An operating method of a memory controller, the operating method comprising:

determining a throughput based on a congestion degree at an egress port of the memory controller;

determining a time window according to a fill-level of a response buffer that stores responses provided from a memory device and the throughput; and scheduling second commands corresponding to an internal operation and first commands corresponding to a host-requested operation, while adjusting a priority of the second commands according to a result of comparing the time window with execution times for the second commands.

18. The operating method of claim 17, further comprising:

storing a plurality of sampling signals obtained by sampling a ready signal and a valid signal, which are input to and output from the response buffer, at preset sampling intervals;

generating a back-pressured count value by counting a number of sampling signals that satisfy the back-pressured condition, among the sampling signals; and generating an average congestion rate corresponding to the congestion degree at the egress port, by tracking the back-pressured count value for each monitoring section.

19. The operating method of claim 17, wherein the determining the time window includes:

increasing a width of the time window in accordance with a determination that the fill-level is greater and the throughput is lower; and decreasing the time window in accordance with a determination that the fill-level is lower and the throughput is greater.

20. The operating method of claim 17, wherein the adjusting a priority of the second commands includes:

aligning the execution times for the second commands in a descending order; and sequentially comparing the aligned execution times with the time window to increase the priority of a second command with a certain execution time in accordance with a determination that the certain execution time is less than the time window, or to maintain the priority of the second commands without increasing the priority in accordance with a determination that the execution time having a shortest time is equal to or greater than the time window.

* * * * *